US007441550B2

(12) United States Patent
Ludwig et al.

(10) Patent No.: US 7,441,550 B2
(45) Date of Patent: Oct. 28, 2008

(54) METHOD AND DEVICE FOR ACTIVATING A VALVE OF A FUEL VAPOR RETENTION SYSTEM

(75) Inventors: Wolfgang Ludwig, Butzbach-Maibach (DE); Wolfgang Mai, Eschborn (DE); Jens Pache, Kelkheim (DE)

(73) Assignee: Siemens Aktiengesellschaft, Munich (DE)

( * ) Notice: Subject to any disclaimer, the term of this patent is extended or adjusted under 35 U.S.C. 154(b) by 99 days.

(21) Appl. No.: 11/655,973

(22) Filed: Jan. 19, 2007

(65) Prior Publication Data

US 2007/0163551 A1 Jul. 19, 2007

(30) Foreign Application Priority Data

Jan. 19, 2006 (DE) ...................... 10 2006 002 717

(51) Int. Cl.
*F02M 25/08* (2006.01)
*H01H 47/28* (2006.01)
*H01H 47/32* (2006.01)
*G06F 19/00* (2006.01)

(52) U.S. Cl. ........................ 123/520; 701/114; 361/153

(58) Field of Classification Search ................. 123/516, 123/518–520; 251/129.04, 129.08; 361/152–154; 324/527, 546, 234; 701/103, 114, 115
See application file for complete search history.

(56) References Cited

U.S. PATENT DOCUMENTS 4,683,861 A * 8/1987 Breitkreuz et al. .......... 123/698
4,764,729 A * 8/1988 Yakuwa et al. .............. 324/546
4,865,000 A * 9/1989 Yajima ....................... 123/520
4,870,364 A * 9/1989 Trox et al. .................. 324/418
5,243,296 A * 9/1993 Ando et al. ................. 324/546
5,351,193 A * 9/1994 Poirier et al. ................. 701/99
5,623,914 A * 4/1997 Kawamoto et al. .......... 123/689
5,727,532 A * 3/1998 Everingham et al. ........ 123/520
5,873,350 A * 2/1999 Wild et al. .................. 123/520
5,921,224 A * 7/1999 Sinnamon ............. 123/568.21

(Continued)

FOREIGN PATENT DOCUMENTS

DE 42 18 541 A1 12/1993

(Continued)

OTHER PUBLICATIONS

Van Basshuysen/Schäfer; "Handbuch Verbrennungsmotor"; Grundlagen, Komponenten, Systeme, Perspektiven; Siemens VDO Automotive; 2002; pp. 604-607; Vieweg Verlag.

*Primary Examiner*—Thomas N Moulis
(74) *Attorney, Agent, or Firm*—Bell, Boyd & Lloyd LLP

(57) ABSTRACT

For the purposes of a determination of a fuel vapor loading level of a fuel vapor retention system of a combustion engine, an opening level of a valve of the fuel vapor retention system is increased in steps or continuously during a determination phase. Furthermore, the valve is activated at most a predefined first period prior to a start of the determination phase by a conditioning pulse at least whenever the valve was closed previously for a second period that is longer than a predefined threshold value. The conditioning pulse is generated in such a way that the valve definitely opens at most for a predefined opening period and then closes again.

14 Claims, 2 Drawing Sheets

U.S. PATENT DOCUMENTS

| | | | | |
|---|---|---|---|---|
| 5,959,825 | A * | 9/1999 | Harcombe | 361/154 |
| 6,148,804 | A * | 11/2000 | Blomquist et al. | 123/520 |
| 6,283,095 | B1 * | 9/2001 | Krueger | 123/499 |
| 6,364,281 | B1 * | 4/2002 | DeLand et al. | 251/129.04 |
| 6,394,414 | B1 * | 5/2002 | Breitling et al. | 251/129.04 |
| 6,516,786 | B2 * | 2/2003 | Krimmer et al. | 123/520 |
| 6,966,325 | B2 * | 11/2005 | Erickson | 137/1 |
| 7,096,113 | B2 * | 8/2006 | Ludwig et al. | 701/114 |

FOREIGN PATENT DOCUMENTS

| | | | |
|---|---|---|---|
| DE | 44 27 688 | C2 | 7/1998 |
| DE | 10 2004 022 999 | B3 | 12/2005 |

* cited by examiner

METHOD AND DEVICE FOR ACTIVATING A VALVE OF A FUEL VAPOR RETENTION SYSTEM

CROSS REFERENCE TO RELATED APPLICATIONS

This application claims priority of German application No. 10 2006 002 717.5 filed Jan. 19, 2006, which is incorporated by reference herein in its entirety.

FIELD OF INVENTION

The invention relates to a method and a corresponding device for activating a valve of a fuel vapor retention system of a combustion engine for the purposes of a determination of a fuel vapor loading level of the fuel vapor retention system.

BACKGROUND OF THE INVENTION

A fuel vapor retention system is disclosed, for example, in van Basshuysen & Schäfer, "Handbuch Verbrennungsmotor", 2nd edition, Vieweg Verlag, 2002, pages 604 to 607. Such a fuel vapor retention system is provided within a motor vehicle, for example, in order to absorb and store fuel vapor that forms in a fuel tank due to evaporation, with the result that the fuel vapor cannot escape into the environment. A fuel vapor retention filter is provided within the fuel vapor retention system as a store for the fuel vapor, said filter using, for example, activated carbon as the storage medium. The fuel vapor retention filter only displays a limited storage capacity for fuel vapor. In order to be able to use the fuel vapor retention filter over a long period, said filter must be regenerated. During regeneration, the combustion engine draws. in the fuel vapor stored in the fuel vapor retention filter. The fuel vapor is thus fed to the combustion in the combustion engine and the absorption capacity of the fuel vapor retention filter for fuel vapor is thus restored. A valve of the fuel vapor retention system is arranged between the fuel vapor retention filter and a suction pipe of the combustion engine for the purposes of dosing the fuel vapor quantity that the combustion engine draws in from the fuel vapor retention filter.

DE 10 2004 022 999 B3 discloses a method for determining a control characteristic for a valve of a fuel vapor retention system of a combustion engine. The control characteristic represents a current relationship between a pulse-width-modulated control signal being used for activating the valve and a valve position being set. A currently valid minimum pulse width of the control signal, which is currently required for opening the valve, is determined by increasing the pulse width in steps up to the detection of a deviation of the instantaneous behavior of the engine with respect to a steady-state behavior of the combustion engine. Said increasing of the pulse width in steps starts at a predefined value of the pulse width that is greater than zero and smaller than a value corresponding to a minimum pulse width determined at an earlier time point.

SUMMARY OF INVENTION

The object of the invention is to create a method and a corresponding device for activating a valve of a fuel vapor retention system that enables a reliable and precise determination of a fuel vapor loading level of the fuel vapor retention system.

The object is achieved by the features of the independent claims. Advantageous developments of the invention are characterized in the sub-claims.

The invention is distinguished by a method and a corresponding device for activating a valve of a fuel vapor retention system of a combustion engine. For the purposes of a determination of a fuel vapor loading level of the fuel vapor retention system, an opening level of the valve is increased in steps or continuously during a determination phase. Furthermore, the valve is activated at most a predefined first period prior to a start of the determination phase by a conditioning pulse at least whenever the valve was closed previously for a second period that is longer than a predefined threshold value. The conditioning pulse is generated in such a way that the valve definitely opens at most for a predefined opening period and then closes again.

The invention is based on the finding that the valve of the fuel vapor retention system, in the case of a first opening event at the start of the determination phase following an interruption in operation that exceeds the predefined threshold value and during which the valve is closed, only opens where relevant if the valve, by deviation from an otherwise valid control characteristic for the valve, is activated with a stronger control signal. This corresponds to a "sticking" of the valve in its closed position. As a result, the valve remains closed at the start of the determination phase, although it should already be opened, and opens abruptly upon activation with the stronger control signal with an opening level due to which, depending on the fuel vapor loading level of the fuel vapor retention system, too great a quantity of fuel vapor is fed, where relevant, to the combustion engine. This can result in an impairment of the operation of the combustion engine and an increase in pollutant emissions. Providing the conditioning pulse prior to the determination phase improves the opening behavior of the valve for the following determination phase, with the result that said phase can be effected reliably and precisely. Furthermore, a disturbance in the operation of the combustion engine can be reduced or prevented by a suitable configuration of the conditioning pulse, with the result that a reliable, low-pollution operation of the combustion engine is possible.

In an advantageous embodiment of the invention, the predefined opening period of the valve in the case of the conditioning pulse comprises at most 100 milliseconds. This has the advantage that the quantity of fuel vapor flowing at most through the valve during the opening period of the valve is small and as a result only a small disturbance in the operation of the combustion engine can be caused.

In a further advantageous embodiment of the invention, the predefined first period comprises approximately between 0.5 and 15 seconds. This has the advantage that any disturbance in the operation of the combustion engine can be reliably corrected during the predefined first period, said disturbance being caused by the quantity of fuel vapor that is fed additionally, where relevant, to the combustion engine on the basis of the conditioning pulse.

In a further advantageous embodiment of the invention, the predefined threshold value comprises at least 30 seconds. This has the advantage that the valve is only activated with the conditioning pulse if there is a high risk of a possible impairment of the opening behavior of the valve at the start of the determination phase. This risk rises with the second period during which the valve is closed uninterruptedly. It is particularly advantageous to activate the valve with the conditioning pulse at the first opening after a start-up of operation of the combustion engine.

BRIEF DESCRIPTION OF THE DRAWINGS

In the following, exemplary embodiments of the invention are explained on the basis of the schematic drawings. These show.

Elements of the same design or function are labeled with the same reference symbols in all the figures.

DETAILED DESCRIPTION OF INVENTION

Figure 1:
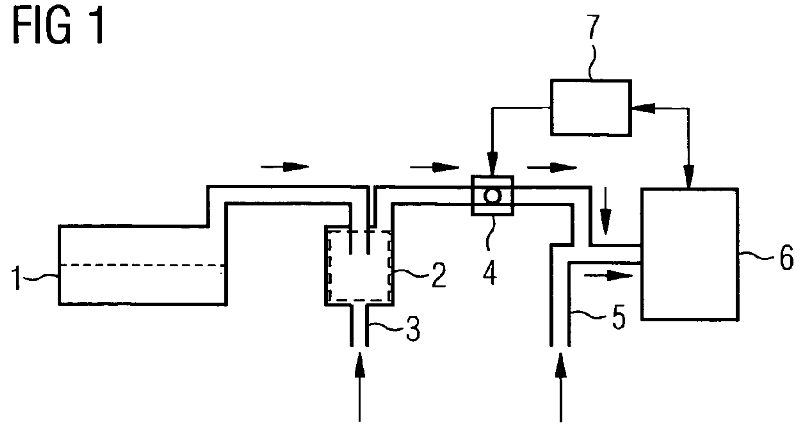
FIG. 1 a fuel vapor retention system.

A fuel vapor retention system comprises a fuel vapor retention filter 2 with a fresh-air feed 3 and a valve 4 (FIG. 1). The fuel vapor retention filter 2 is coupled to a fuel tank 1 on the input side. Fuel vapor that collects in the fuel tank 1 due to evaporation of the fuel in the fuel tank 1 is fed to the fuel vapor retention filter 2. The fuel vapor retention filter 2 displays a storage medium for fuel vapor which comprises e.g. activated carbon. The fuel vapor retention filter 2 is coupled on the output side, via the valve 4, to a suction pipe 5 of a combustion engine 6.

Furthermore, a control unit 7 is provided that is coupled to the valve 4 and that is configured to feed a control signal to said valve for opening and closing the valve 4. The control signal is, for example, pulse-width modulated and a PWM value of the control signal is predefined by an associated pulse width. However, the control signal can also be configured differently.

The control unit 7 is furthermore coupled to the combustion engine 6 and configured for feeding actuating signals to actuators of the combustion engine 6 and for capturing sensor signals from sensors of the combustion engine 6. The actuators of the combustion engine 6 comprise, for example, a throttle valve or injection valves of the combustion engine 6. The sensors of the combustion engine 6 comprise, for example, an oxygen concentration sensor, which is also referred to as a Lambda probe, and which captures a residual oxygen content in the exhaust gas of the combustion engine 6, or a temperature sensor for capturing a temperature of the combustion engine 6. The control unit 7 is configured to regulate, as a function of the captured residual oxygen content of the exhaust gas, a fuel apportionment to the combustion engine 6 by means of corresponding activation of the injection valves, with the result that a predefined fuel/air ratio is produced for the combustion.

The fuel vapor from the fuel tank 1 is stored in the fuel vapor retention filter 2, particularly during interruptions in operation of the combustion engine. Storing the fuel vapor in the fuel vapor retention filter 2 prevents the fuel vapor from escaping to the environment unused. However, the storage capacity of the fuel vapor retention filter 2 is limited. For the purposes of regenerating the fuel vapor retention filter 2, the valve 4 is opened during the operation of the combustion engine 6 and the stored fuel vapor is fed to the combustion in the combustion engine 6. The fuel vapor in the fuel vapor retention filter 2 is drawn in together with fresh air during the operation of the combustion engine 6 by a partial vacuum in the suction pipe 5 while the valve 4 is opened. The fuel vapor retention filter 2 is flushed by the fresh air that is drawn in through the fresh-air feed 3 and can subsequently absorb and store fuel vapor from the fuel tank 1 once more.

A fuel vapor loading level of the fuel vapor retention system, and particularly of the fuel vapor retention filter 2, is unknown at a start-up of operation of the combustion engine 6 and also after further interruptions in operation of the fuel vapor retention system during which the valve 4 is closed. It is thus particularly unknown what quantity of fuel vapor is actually being fed to the combustion engine 6 for the combustion if the valve 4 is opened with a predefined opening level. However, for a reliable and low-pollution operation of the combustion engine 6, it is necessary to take account of the quantity of fuel vapor that is additionally fed to the combustion by the fuel vapor retention system.

Figure 2:
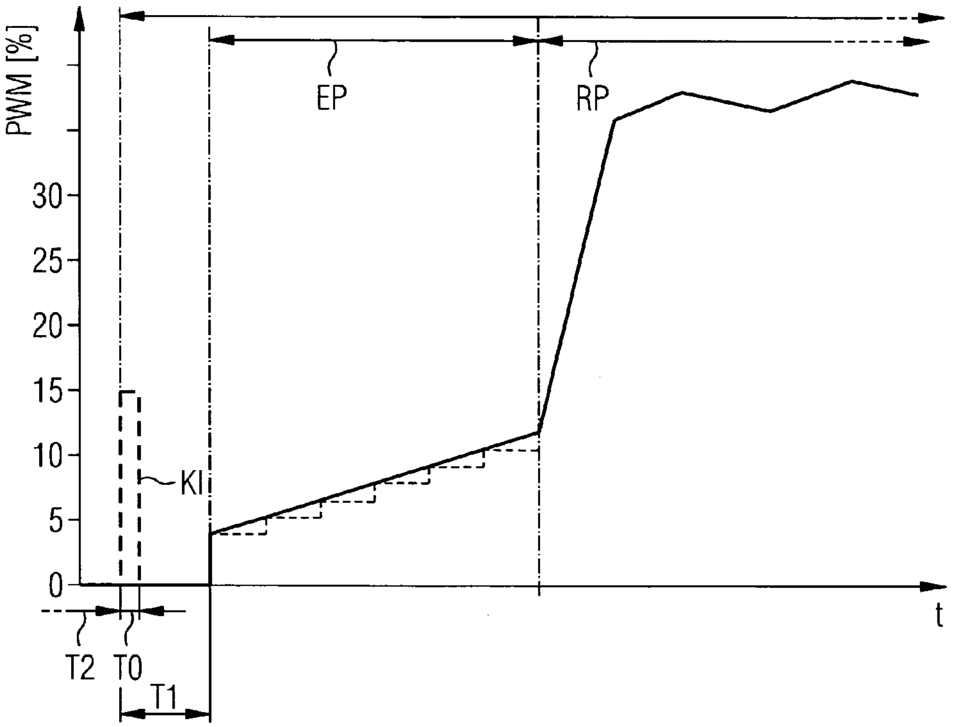
FIG. 2 a profile over time of a control signal of a valve of the fuel vapor retention system, and FIG. 3 a flowchart of a method for activating the valve.

Consequently, a determination phase EP is provided, which is preferably implemented in the presence of a predefined operating condition BB or a predefined operating state of the combustion engine 6, e.g. in the presence of the steady-state operation of the combustion engine 6 (FIG. 2). During the determination phase EP, the valve 4 is activated in such a way that an opening level of the valve 4 is increased in steps or continuously starting from a closed state of the valve 4. As a result, only very little fuel vapor is fed to the combustion engine 6 and the control unit 7 can reliably regulate the quantity of fuel fed to the combustion overall per work cycle by correspondingly reducing the quantity of fuel fed through the injection valves. Said regulation of the quantity of fuel is effected, for example, as a function of the captured residual oxygen content in the exhaust gas of the combustion engine 6. The fuel vapor loading level is preferably determined as a function of a required correction level of the quantity of fuel fed to the combustion through the injection valves, said correction level resulting in the case of an essentially unchanged residual oxygen content in the exhaust gas of the combustion engine 6. Furthermore, the fuel vapor loading level is determined as a function of the opening level of the valve 4. The wider the valve 4 is opened, the greater the quantity of fuel vapor that can be fed to the combustion.

The regeneration of the fuel vapor retention filter 2 is essentially effected during a regeneration phase RP. The precondition for carrying out the regeneration phase RP is a known current fuel vapor loading level of the fuel vapor retention filter 2. This means that a corresponding correction of the quantity of fuel fed to the combustion through the injection valves is possible during the regeneration phase RP as a function of the fuel vapor loading level of the fuel vapor retention filter 2 and the opening level of the valve 4. Furthermore, the valve 4 can be activated by the control unit 7 in such a way that a predefined quantity of fuel vapor is fed to the combustion engine. The determination phase EP is implemented immediately before or with only a small time gap before the regeneration phase RP, with the result that the fuel vapor loading level determined during the determination phase EP is still current at the start of the following regeneration phase RP. The time gap preferably comprises not more than fifteen seconds. The fuel vapor loading level is preferably determined again during the regeneration phase RP, with the result that the respective current fuel vapor loading level is available for activating the valve 4.

However, experiments have shown that, following interruptions in operation of the valve 4 and particularly in the case of a first opening of the valve 4 following a start-up of operation of the combustion engine 6, the valve 4 does not open as envisaged at the start of the determination phase EP. The valve "sticks" in its closed state. For the first opening after the interruption in operation, a higher PWM value of a control signal of the valve 4 is then required than for subsequent opening events of the valve 4 where the valve 4 was previously closed for only a few seconds or a few minutes, e.g. one to two minutes.

The opening behavior of the valve 4 at the start of the determination phase EP can be improved by means of activation of the valve 4 by a conditioning pulse KI prior to the start of the determination phase EP. The determination phase EP starts a predefined first period T1 after a start of the conditioning pulse KI. The predefined first period T1 is preferably predefined as a function of an expected propagation time of the fuel vapor from the valve 4 into the combustion chambers of the combustion engine 6 and/or as a function of a period that is provisionally required for the correction of the disturbance due to the imported fuel vapor. The predefined first period T1 preferably comprises between approximately 0.5 and 15 seconds; it can also be shorter or longer, however. In particular, the determination phase EP can also be implemented immediately after the conditioning pulse KI.

The conditioning pulse KI places the valve 4 in a state that makes it possible to open the valve 4 in steps or continuously in accordance with a predefined control characteristic in the next determination phase EP. The conditioning pulse KI is configured in such a way that the valve 4 definitely opens for an opening period TO of preferably at most 100 milliseconds and then closes again. For the purposes of definite and reliable opening, the valve 4 is activated with a PWM value of the control signal that lies substantially above a minimum value of the control signal for opening the valve 4, e.g. at double or triple the minimum value. As a function of an embodiment of the valve 4, a larger or smaller PWM value of the control signal may also be suitable for the definite opening of the valve 4. The minimum value of the control signal for opening the valve 4 is predefined, for example, by the control characteristic for the valve 4. The conditioning pulse KI is furthermore configured in such a way that even in the case of a high fuel vapor loading level of the fuel vapor retention filter 2, only so little fuel vapor enters the combustion engine 6 that the operation of the combustion engine 6 is not essentially disturbed as a result, i.e. the additionally imported unknown quantity of fuel can be reliably corrected by the control unit 7. It is particularly advantageous to activate the valve 4 by the conditioning pulse KI prior to the determination phase EP at least whenever the valve 4 was closed previously for a second period T2 and the second period T2 is longer than a predefined threshold value TH1, which comprises at least 30 seconds, for example. The second period T2 corresponds to the interruption in operation of the valve 4.

Figure 3:
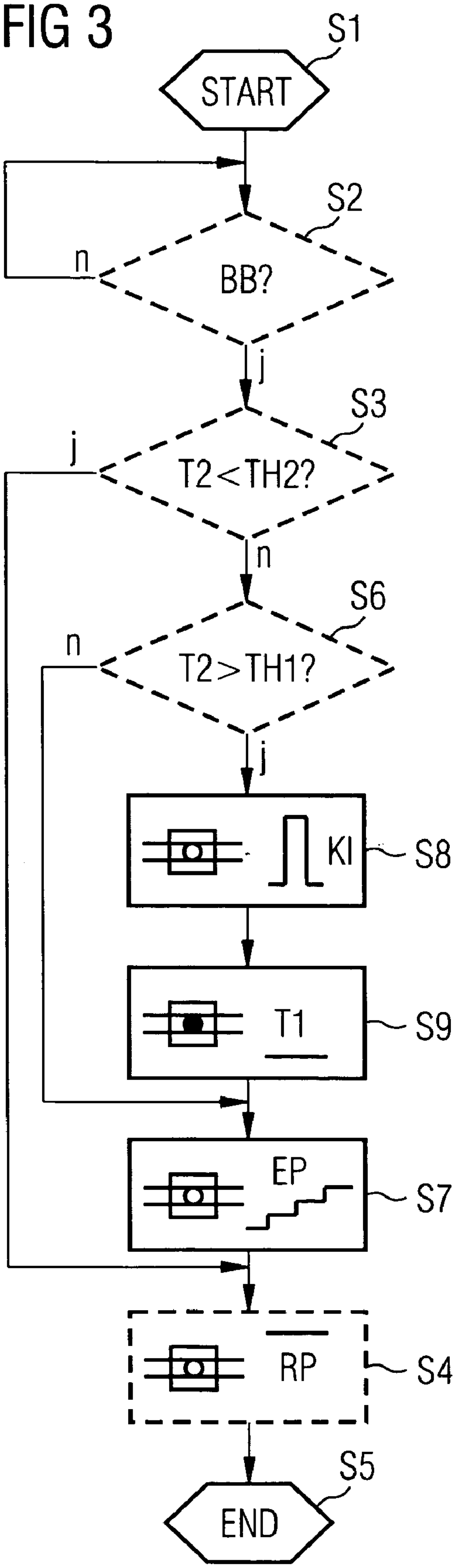

FIG. 3 shows a flowchart of a program for activating the valve 4 of the fuel vapor retention system. The control unit 7 is preferably configured to execute the program. The program starts at a step S1. The step S1 is executed, for example, in the case of the start-up of operation of the combustion engine 6. In a step S2, a check is carried out as to whether the predefined operating condition BB, e.g. the steady-state operation of the combustion engine 6, applies. If the predefined operating condition BB applies, processing is continued in a step S3; otherwise, the step S2 is executed again.

In the step S3, a check is carried out as to whether the second period T2 is shorter than a further predefined threshold value TH2. The further predefined threshold value TH2 is predefined in such a way that the fuel vapor loading level cannot essentially change during this period and preferably comprises at most 15 seconds. If the condition is fulfilled in step S3, the determination phase EP does not need to be implemented and processing is continued in a step S4. In the step S4, the regeneration phase RP is implemented and the program is terminated in a step S5.

If the condition is not fulfilled in the step S3, i.e. the second period T2 is at least as long as the further predefined threshold value TH2, processing is continued in a step S6. In the step S6, a check is carried out as to whether the second period T2 is longer than the predefined threshold value TH1. If this condition is not fulfilled, the conditioning pulse KI is not required and processing is continued in a step S7. In the step S7, the determination phase EP is implemented. If the fuel vapor loading level determined is so great that the fuel vapor retention filter 2 is to be regenerated, the regeneration phase RP is implemented in the step S4 and the program is terminated in the step S5.

If the condition is fulfilled in the step S6, however, i.e. if the second period T2 is longer than the predefined threshold value TH1, the valve 4 is activated with the conditioning pulse KI in a step S8. Where relevant, the valve 4 remains closed in a step S9 after the conditioning pulse KI until the expiry of the predefined first period T1, before the determination phase EP is implemented in the step S7.

After the termination of the program in the step S5, the program can be started up again in the step S1. Furthermore, the program can also be terminated in the step S5, for example, if the predefined operating condition BB no longer applies. If required, the valve 4 is put into its closed state when the program is terminated.

The invention claimed is:

1. A method for activating a valve of a fuel vapor retention system of a combustion engine to determine a fuel vapor loading level of the fuel vapor retention system, comprising:

activating the valve for a predefined first period prior to a start of a determination phase by a conditioning pulse at least whenever the valve had been closed for a second period that is longer than a predefined threshold value, the conditioning pulse is generated such that the valve opens for a predefined opening period and then closes; and increasing an opening level of the valve during the determination phase.

2. The method as claimed in claim 1, wherein the valve is activated at most for the predefined first period prior to the start of the determination phase.

3. The method as claimed in claim 1, wherein the opening level of the valve is increased in steps or continuously during the determination phase.

4. The method as claimed in claim 3, wherein the predefined opening period is at most 100 milliseconds.

5. The method as claimed in claim 4, wherein a duration of the predefined first period is approximately between 0.5 and 15 seconds.

6. The method as claimed in claim 5, wherein the duration of the predefined first period is between 0.5 and 15 seconds.

7. The method as claimed in claim 6, wherein the predefined threshold value is at least 30 seconds.

8. A device for activating a valve of a fuel vapor retention system of a combustion engine configured to determine a fuel vapor loading level of the fuel vapor retention system:

an actuator for increasing an opening level of the valve during a determination phase;

an activation device for activating the valve by a conditioning pulse for a predefined first period prior to a start of the determination phase at least whenever the valve is closed previously for a second period greater than a predefined threshold value; and a generating device that generates the conditioning pulse such that the valve opens at most for a predefined opening period and then closes.

9. The device as claimed in claim 8, wherein the valve is activated at most for the predefined first period prior to the start of the determination phase.

10. The device as claimed in claim 8, wherein the opening level of the valve is increased in steps or continuously during the determination phase.

11. The device as claimed in claim 9, wherein the predefined opening period is at most 100 milliseconds.

12. The device as claimed in claim 11, wherein a duration of the predefined first period is approximately between 0.5 and 15 seconds.

13. The device as claimed in claim 12, wherein the duration of the predefined first period is between 0.5 and 15 seconds.

14. The device as claimed in claim 13, wherein the predefined threshold value is at least 30 seconds.

* * * * *